United States Patent [19]

Rosenberg et al.

[11] Patent Number: 4,615,438
[45] Date of Patent: Oct. 7, 1986

[54] HELMET SHELL ASSEMBLY AND METHOD AND APPARATUS FOR MAKING

[75] Inventors: Isadore Rosenberg, Downey; Patrick R. Terisse, Covina; Valentin Castro, Pasadena, all of Calif.

[73] Assignee: Figgie International Inc., Willoughby, Ohio

[21] Appl. No.: 767,419

[22] Filed: Aug. 20, 1985

[51] Int. Cl.⁴ .......................... B65D 69/00; A42B 3/02
[52] U.S. Cl. ......................................... 206/223; 2/425
[58] Field of Search ..................... 2/410, 6, 422, 425; 206/223

[56] References Cited

U.S. PATENT DOCUMENTS

| Re. 29,742 | 8/1978 | Tung | 2/422 X |
|---|---|---|---|
| 2,293,308 | 8/1942 | Riddel et al. | 2/410 |
| 3,245,087 | 4/1966 | Marchello | 2/422 |
| 3,444,288 | 5/1969 | Mead | 2/410 X |
| 3,577,561 | 5/1971 | Oshima | 2/422 |
| 3,582,990 | 6/1971 | Frieder | 2/6 |
| 3,770,483 | 11/1973 | Komine | 2/410 X |
| 4,008,949 | 2/1977 | Luna | 2/410 X |
| 4,018,332 | 4/1977 | Benda | 206/223 |
| 4,466,138 | 8/1984 | Gessalin | 2/410 X |

FOREIGN PATENT DOCUMENTS 2641780 3/1978 Fed. Rep. of Germany .......... 2/410

*Primary Examiner*—Louis K. Rimrodt
*Attorney, Agent, or Firm*—Christel, Bean & Linihan

[57] ABSTRACT

A helmet shell assembly wherein a helmet shell is provided with a covering of normally flat thermoplastic material which is disposed on the shell in such a manner as to have a minimum number of seams. The assembly is made by inserting a support member (44) into a helmet shell (12), positioning the shell and support into a cavity (50) of a forming fixture (46), then draping a sheet of softened thermoplastic material (16) [which is supported by a frame (48)] over one side of the shell, vacuum forming the sheet (16) about the side of the shell, and then trimming the sheet after it has set. The other side of the helmet shell is then covered by repeating the above steps, and then a tape is applied over the length of the helmet to cover the exposed seams. A protective coating and an edge roll may then be applied. The shell may initially be covered with a surface finish.

1 Claim, 6 Drawing Figures

HELMET SHELL ASSEMBLY AND METHOD AND APPARATUS FOR MAKING

FIELD OF THE INVENTION

The present invention relates generally to a helmet shell assembly such as the type worn by military aviators, and more particularly to a helmet shell assembly wherein a helmet shell is provided with a covering of normally flat material which is disposed on the shell in such a manner as to have a minimum number of seams, and to a method and apparatus for making the same.

BACKGROUND OF THE INVENTION

The present invention will be described in connection with a helmet shell provided with a reflective material. There are a number of situations where the application of reflective material to the exterior surface of helmet shells can be of significant life saving value. Reflective covering currently being applied to head gear by reflective tape, usually containing glass beads as reflective media. The tapes are applied along the sides and top of the helmet shell. These taped helmet shells are covered by overlapping 1" or 2" strips of tape. The tape patterns, as presently being applied, are being overlapped as they are placed on the exterior surface of the helmet shell, overlapping being necessary due to the varied contours of the helmet surface. This method of application can avoid gaps and wrinkles but creates and excessive number of exposed seams. Thus, overlapping by as much as ½" to ¾" is sometimes required with these multiple tape patterns. The exposed seams are subject to fraying and/or peeling due to normal handling and various atmospheric weathering conditions. In the case of flight helmets, the reflective covering must withstand exposure to sunlight, temperatures of $-20°$ to $140°$ F., cleaning solutions, and immersion in rough seas (that can occur during an emergency situation) without loss of reflective properties or a degradation in appearance. The problems associated with multiple patterns result in wide wearer unacceptance which in turn reduces the number of reflectorized head gear now in service.

The multiple seam prior art approach using only adhesive tapes in addition to providing poor user acceptance, have the additional drawbacks of high labor costs in applying the tapes, low performance characteristics, increased weight, poor appearance, short life span and incomplete covering when compared to the invention of this application.

The advantage of having reflective material on a flight helmet can be appreciated when one considers that it may be necessary to search for a downed pilot in open seas at night. Tests indicate that objects provide with reflective material can be seen from search heights of 3½ to 4 times greater than objects not provided with reflective material. Thus, search planes can cover a much greater area in the same amount of time with a reasonable likelihood of seeing the downed aviator.

OBJECTS AND SUMMARY OF THE INVENTION

It is an object of the present invention to provide a new system of covering the exterior surface of a helmet shell with reflective materials, the system being of lower labor cost that prior systems, having improved performance (reflectivity) characteristics, and an improved life span and appearance due to fewer seams.

More particularly, it is an object of the present invention to provide a helmet shell assembly wherein the exterior surface of a helmet shell is covered entirely by two side sheets of normally flat reflective thermoplastic material which are thermoformed to opposite side portions of a helmet shell, a central strip of the exterior surface between the opposite side portions being entirely covered by an adhesive tape of reflective material.

It is a further object of the present invention to provide a novel method of applying reflective coverings to a helmet shell, which method includes heating and thermoforming a softened sheet of thermoplastic material to one side portion of an exterior surface of a helmet shell and then, after cooling, trimming the thermoplastic reflective material along a side portion of the marginal edge of the helmet shell and also along a line which is a substantially fixed distance from a fore and aft extending plane which passes through the center of the helmet shell, applying a second sheet of thermoplastic reflective material to the opposite side portion of the exterior surface of the helmet shell by the same method as outlined above, and then by applying an adhesive tape of reflective material to the exposed central strip surface of the exterior surface of the helmet shell to cover the area of the shell disposed between the first and second sheets of thermoformed reflective material.

It is a further object of the present invention to provide a kit for retrofitting helmet shells with a covering of reflective material with a minimum number of seams, the kit including a support member which is adapted to be inserted within the helmet shell and having a surface closely adjacent the lower peripheral marginal edge of the helmet shell when fully inserted, a forming fixture provided with a centrally located cavity, the surface of which which conforms to one side of said helmet shell and said support member, the forming fixture further including a generally planar raised peripheral edge surface and an intermediate surface extending between the centrally located cavity and the peripheral edge surface, the intermediate surface being provided with ducting air dams and a plurality of orifices. The fixture additionally includes a plenum chamber disposed beneath the intermediate surface, which plenum surface is adapted to be connected to a vacuum line. The kit additionally includes a frame assembly adapted to receive a flat sheet of thermoplastic material and to support the thermoplastic material for heating and also for disposition onto the generally planar raised peripheral edge surface of the forming fixture. The kit may further include an edge roll which can be snap fitted onto the marginal edge of the helmet after the reflective materials have been assembled onto the helmet.

The above objects and other objects and advantages of this invention will be more fully understood after a consideration of the following detailed description taken in conjunction with the accompanying drawings which illustrate various features of this invention.

DETAILED DESCRIPTION

Figure 4:
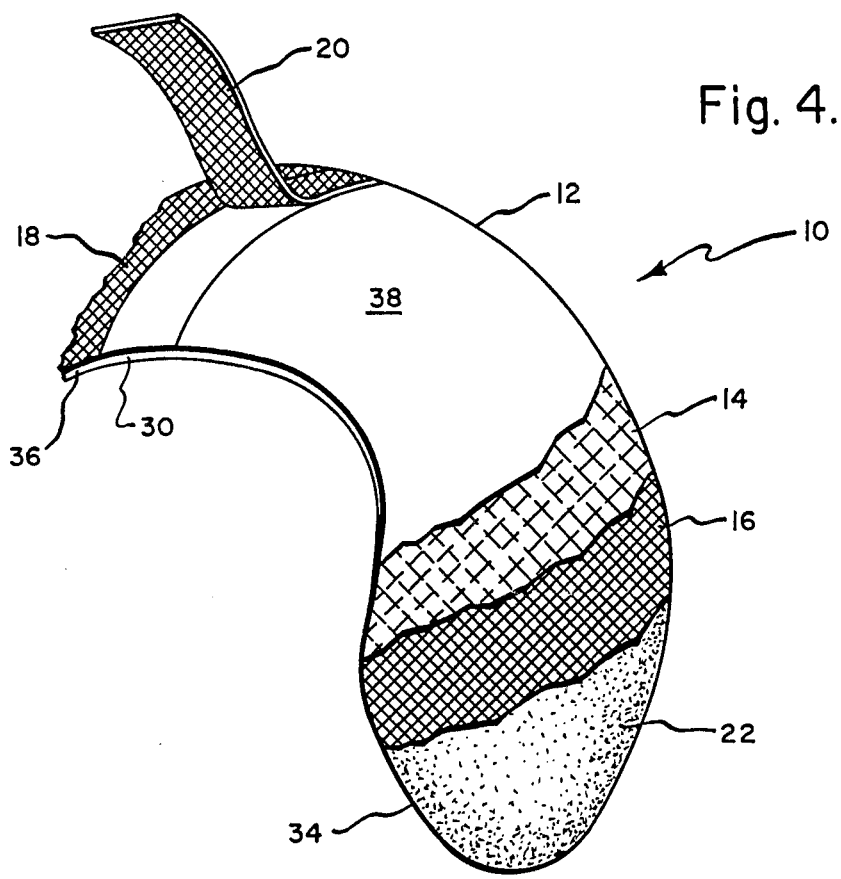
FIG. 4 is a perspective view of a portion of a helmet shell assembly embodying this invention, various surfaces being broken away.
Figure 5:
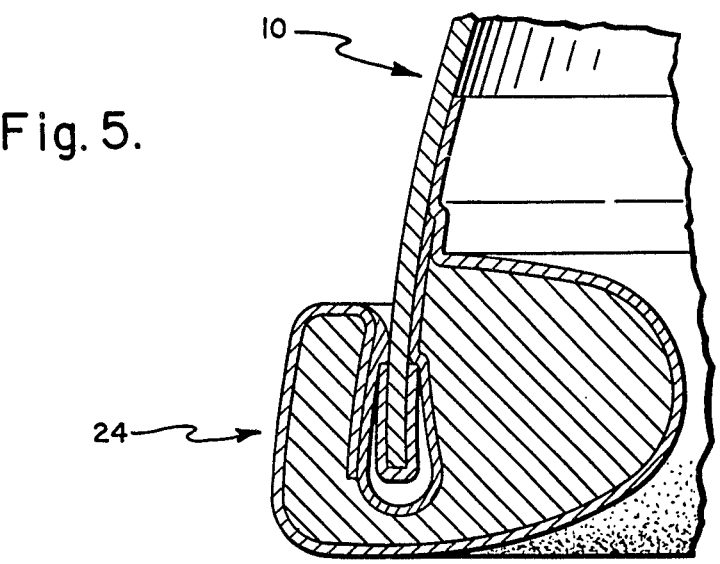
FIG. 5 is a sectional view through a marginal edge portion of the helmet assembly of this invention additionally showing an edge roll assembly mounted onto the novel helmet shell assembly of this invention.

In FIG. 4 a helmet shell assembly assembly is partially illustrated, the assembly being of the type which is generally worn by aviators of military aircraft, the helmet shell assembly being indicated generally at 10. As can best be seen from FIG. 4, the helmet shell assembly consists of a number of component parts, these being a helmet shell 12 which, as is conventional in this type of helmet, is substantially semi-spherical in shape. In addition to the helmet shell, the assembly further includes a surface finish in contact with the helmet shell, first and second sheets of thermoplastic material 16, 18, respectively, which have been thermoformed to adapt to the contours of opposite side portions of the helmet shell, and adhesive tape 20, and a protective coating 22 which is painted over the thermoformed sheets 16 and 18 and the adhesive tape 20. The helmet shell assembly is in turn further adapted to reaceive an edge roll assembly indicated generally at 24 in FIG. 5, and a helmet liner (not shown) which is adapted to closely conform to portions of the wearers head. The edge roll assembly may be of the type shown in U.S. Pat. No. 3,806,949, the subject matter of which is incorporated herein by reference thereto. While the large cross sectional area of the edge roll assembly is shown on the inside of the helmet shell assembly, it may also be disposed on the outside of the helmet shell assembly.

Figure 1:
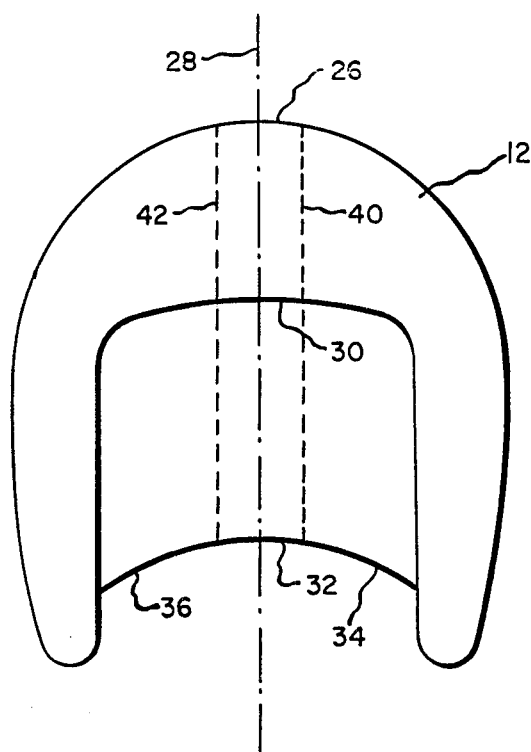
FIGS. 1, 2 and 3 are front, side sectional and top views, respectively of a helmet shell which can be provided with reflective sheeting in accordance with this invention.
Figure 2:
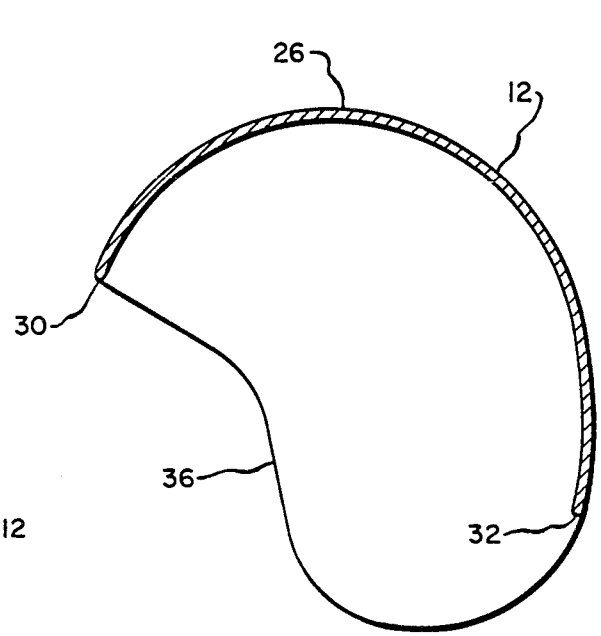
Figure 3:
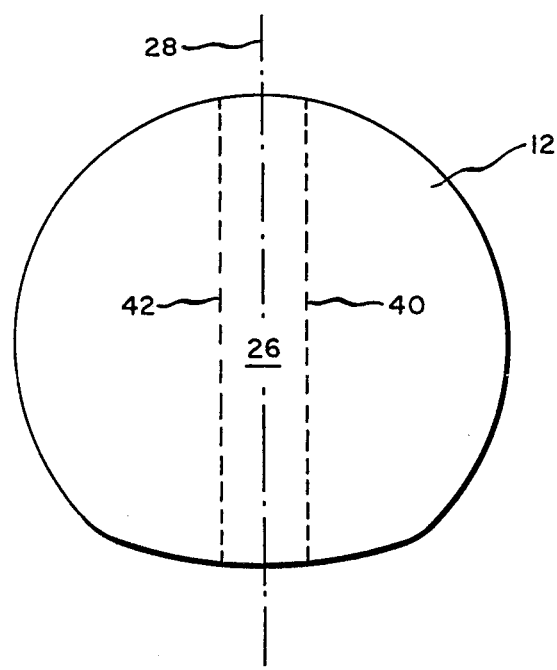

With further reference to FIGS. 1, 2 and 3, it should be noted that the helmet shell, when in its normal position of use, has an upper crown portion 26 and a lower marginal edge which extends entirely about the periphery of the helmet shell. For reference purposes, the front of the helmet is shown to the left in FIG. 2. The helmet shell is symmetrical about a fore and aft extending vertical plane indicated by the dot dash line 28 in FIGS. 1 and 3, the plane passing through the upper crown portion 26. The lower marginal edge has a front portion 30, a rear portion 32 and opposite side portions 34, 36. The exterior surface 38 of the shell receives the surface finish, the surface finish in turn providing a surface which is free from irregularities and improves the adhesion of the sheets 16 and 18 and tape 20. Thus, the surface finish which will be under the sheets and tape and covers the entire exterior surface of the helmet shell. However, the sheets 16 and 18 and tape 20 only cover certain prescribed areas of the shell. Thus, sheet 16 will be thermoformed about the left side portion of the helmet shell and will, after trimming, cover the entire side surface portion of the shell from the left side portion 34 of the marginal edge to a line 40 which is a substantially fixed distance from the fore and aft extending vertical plane 28. Similarly, the right sheet of thermoformed material 18 will, after trimming, cover the exterior surface of the shell from the right side marginal edge 36 to another line 42 which is disposed to the other side of the plane 28. Both lines 40 and 42 are at substantially the same fixed distance from the plane 28. After the two sheets have been thermoformed and adhesively secured to side portions of the shell, a tape is installed over the exposed portion which lies between the lines 40, 42. The tape must be at least twice the fixed distance and is preferably slightly greater. Thus, in practice, the distance between the plane 28 and one of the lines 40, 42 may be ½" and the width of the tape may be 1¼" thus leaving a slight overlap of ⅛" on each side.

The manner in which the covering is applied to the helmet shell 12 will now be described with reference to a preferred embodiment. Initially, it should be noted that in the preferred embodiment, the tape 20 is of the same material as the sheets 16 and 18, the preferred material being "Scotchlight" brand reflective sheeting with pressure sensitive adhesive, 680 series, this particular brand of sheeting being manufactured by the 3M company. This form of reflective sheeting utilizes millions of microscopic glass beads to capture light and redirect it to its source. The beads are in turn supported on a normally flat thermoplastic backing material. After the exterior surface of the helmet shell has been suitably prepared, as for example by coating it with a surface finish 14, it is ready to receive the sheeting. A first sheet of the thermoplastic material is then heated at 250° F. for 5 seconds until it is soft. The softened sheet is then thermoformed by means of a suitable fixture which draws a vacuum to one side of the sheet, causing the sheet to conform and adhere to one side of the helmet shell. After the thermoplastic material has cooled below its softening point and the adhesive has set, the material is then trimmed along the marginal edge and also is trimmed along one of the lines 40, 42. Thus, if the first sheet 16 of thermoplastic material is applied initially, it will be trimmed along the side portion 34 of the marginal edge and will also be trimmed along line 40. After this procedure is completed, the second sheet 18 of thermoplastic material is then applied to the opposite side portion of the helmet by repeating the same process which is outlined above. After these steps have been completed, the helmet shell has an uncovered portion between the lines 40 and 42. At this time, the adhesive tape 20 is applied to finish covering this portion of the helmet shell, the tape extending from the front portion 30 to the rear portion 32 of the marginal edge and at least abutting or slightly overlapping the edges of the first and second sheets of thermoplastic material 16 and 18 along lines 40, 42. In order to improve the durability of the helmet, a protective coating 22 may be applied, the protective coating for example being a clear polyurethane paint which is merely painted onto the outer surface. In some applications, it will not be necessary to utilize either the surface finish 14 and/or the protective coating 20.

After the helmet shell has had its various coverings applied to it to form the assembly an edge roll 24 can merely be snap fit to the lower marginal edge. Finally, the helmet is provided with its liner.

The shell assembly can be prepared by utilizing a novel kit which is suitable for retrofitting head gear that is already in service. As can be seen from FIG. 6, the kit will consist of essentially three major components, these being a support member indicated generally at 44, a forming fixture indicated generally at 46 and a frame assembly indicated generally at 48. The support member 44 can simply be a mandrel formed of an epoxy material which is adapted to closely conform to the inner marginal edge of the helmet shell when fully inserted. The forming fixture includes cavity 50, the surface of which is adapted to conform to one side of the helmet shell and the support member 44, the surface or cavity 50 receiving the helmet shell and support member in such a manner that only approximately ½ of the helmet shell is not within the cavity 50. Disposed about the edge of the forming fixture is a generally rectangular planar raised peripheral edge surface 52. Extending between the edge surface 52 and the cavity 50 is an intermediate surface 54. This surface is in turn provided with a plurality of orifices 56 and ducting air dams 58, the orifices in turn being interconnected with a plenum chamber disposed beneath the surfaces. The plenum chamber, which is not shown, is adapted to be connected to a vacuum line through tube 60. The frame assembly of the kit includes upper and lower generally rectangular frames 62, 64, respectively, and means to hold the upper and lower frames together when a sheet of thermoplastic material is sandwiched between the frames, which means can be simply hinges (not shown) and latches 66.

Figure 6:
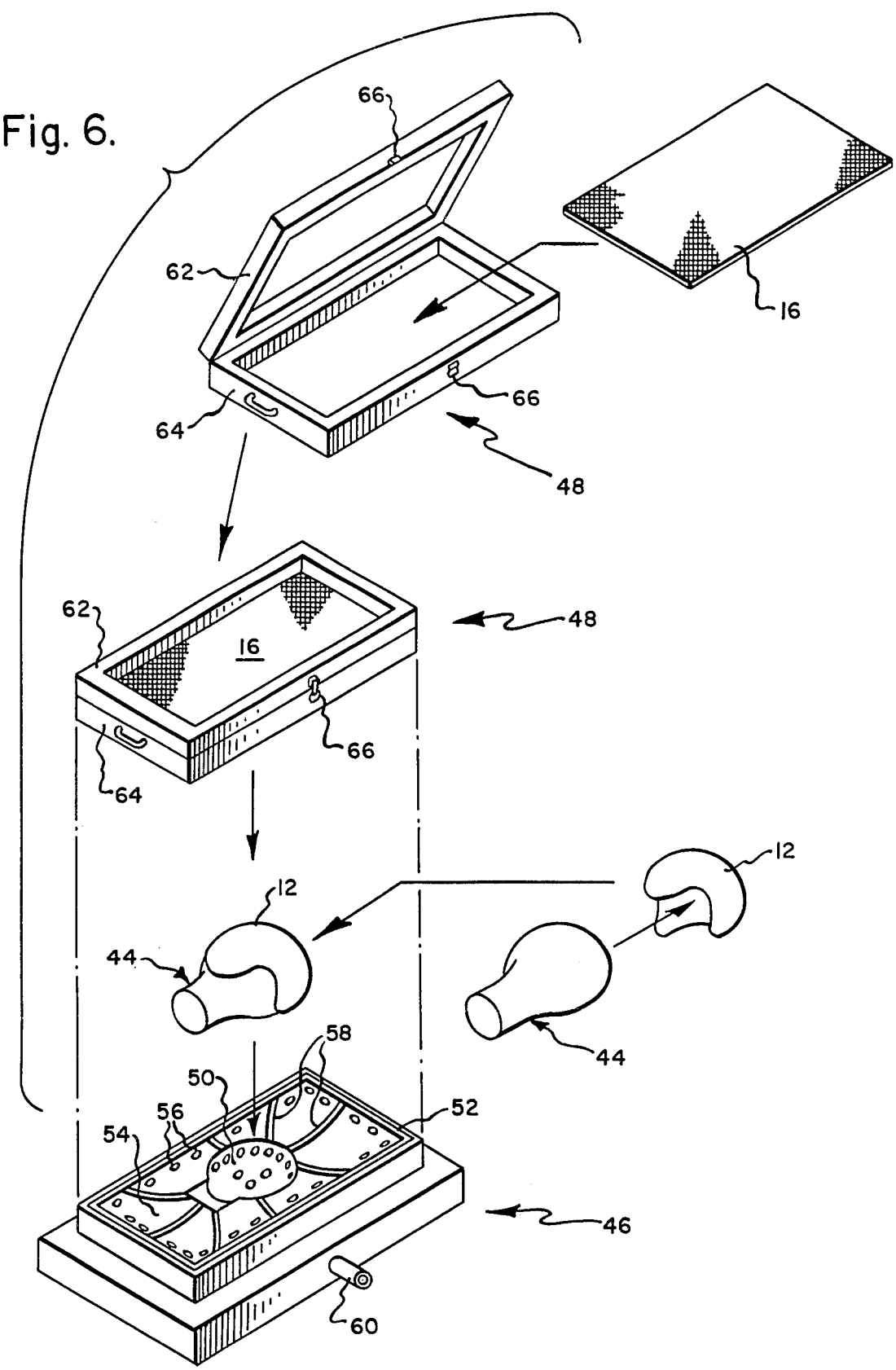
FIG. 6 is a view illustrating the method and apparatus by which the novel helmet shell assembly of this invention may be manufactured.

As can be seen from FIG. 6, the kit is used by simply inserting the support member 44 into the helmet shell, positioning the support member and helmet shell into the cavity 50, inserting a sheet of thermoplastic material 16 or 18 within the frame assembly 48 by opening the frame assembly for the reception of the sheet of material and then closing and latching the frame in such a manner that the edges of the thermoplastic material are firmly held together. The frame is formed of such material that there will be no air leaks between the frame and the sheet of thermoplastic material. The frame can then be inserted into an oven for heating of the thermoplastic material and after the material has been heated to above its softening point, the frame and sheet of material can be draped over the helmet shell and mandrel with the edges of the frame being in contact with the raised edge surface 52. At this time, the tube 60 will then be connected to a source of vacuum, for example 27" Hg., and the softened thermoplastic material will then be thermoformed about one side of the helmet shell. After this operation has been completed, the material is trimmed in the manner previously outlined and then the other side of the helmet can be processed.

It is necessary to provide cavities of differing shapes to accept differing sizes of the helmet. This can be accomplished by either providing a second forming fixture, or alternatively by modifying the interior shape of the cavity 50 to accept the other side of the helmet.

While the present invention has been described in connection with applying a reflective material to a helmet shell, the system outlined in this disclosure has other uses besides the application of reflective material. One of these other applications would include providing a helmet shell with camouflaging materials which is presently done by painting.

While the invention has been described above, it is to be understood that the invention is not limited to the particular details shown and described above, but that, in fact, widely differing means may be employed in the broader aspects of this invention.

What is claimed is:

1. A kit for applying sheets of thermoplastic material to side portions of the exterior surfaces of a helmet shell of the type having in its normal position of use an upper crown portion and a lower peripheral marginal edge, said helmet shells being substantially symmetrical about a fore and aft vertical plane passing through the center of said crown portion; said kit comprising:
   a support member adapted to be inserted within a helmet shell and having a surface closely adjacent the lower peripheral marginal edge of said helmet shell when fully inserted;
   a forming fixture provided with
      a centrally located recessed surface which conforms to one side of said helmet shell and said support member,
      a generally rectangular planar raised peripheral edge surface,
      an intermediate surface extending between the centrally located recessed surface and the peripheral edge surface, said intermediate surface being provided with ducting air dams and a plurality of orifices, and
      a plenum chamber disposed beneath said intermediate surface and adapted to be connected to a vacuum line; and
   a frame assembly adapted to receive said thermoplastic material and to support the thermoplastic material when heated above its softening point and also to be disposed in mating contact with the raised peripheral edge surface of said forming fixture so that when the plenum chamber is connected to a vacuum line the thermoplastic material will be vacuum formed about a side of the helmet shell, said frame assembly including
      upper and lower generally rectangular frames, each frame being of a size which generally corresponds to the size of the generally rectangular peripheral edge surface of the forming fixture, and
      means to hold said frames together when a sheet of thermoplastic material is sandwiched between said frames.

* * * * *